US008075802B2

(12) United States Patent
Roth et al.

(10) Patent No.: US 8,075,802 B2
(45) Date of Patent: *Dec. 13, 2011

(54) LUMINESCENT MATERIAL

(75) Inventors: Gundula Roth, Levenhagen (DE); Walter Tews, Greifswald (DE); Chung Hoon Lee, Seoul (KR)

(73) Assignee: Seoul Semiconductor Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 12/731,811

(22) Filed: Mar. 25, 2010

(65) Prior Publication Data

US 2010/0176342 A1   Jul. 15, 2010

Related U.S. Application Data

(63) Continuation of application No. 11/024,722, filed on Dec. 30, 2004.

(30) Foreign Application Priority Data

Jun. 10, 2004   (KR) .................. 10-2004-0042397

(51) Int. Cl.
C09K 11/75   (2006.01)
C09K 11/66   (2006.01)
C09K 11/71   (2006.01)

(52) U.S. Cl. .... 252/301.4 R; 252/301.4 P; 252/301.4 F; 252/301.6 R; 252/301.6 P; 252/301.6 F

(58) Field of Classification Search ................. None
See application file for complete search history.

(56) References Cited

U.S. PATENT DOCUMENTS

| 2,110,162 | A | 3/1938 | Leverenz |
|---|---|---|---|
| 2,402,760 | A | 6/1946 | Leverenz |
| 2,570,136 | A | 10/1951 | Lyon |
| 2,617,773 | A | 11/1952 | Nagy et al. |
| 2,719,128 | A | 9/1955 | Kressin |
| 2,780,600 | A | 2/1957 | Wollentin |
| 3,143,510 | A | 8/1964 | Wanmaker et al. |
| 3,598,752 | A | 8/1971 | Sisneros et al. |
| 3,644,212 | A | 2/1972 | McAllister et al. |
| 3,893,939 | A | 7/1975 | DeKalb et al. |
| 3,905,911 | A | 9/1975 | Kelsey, Jr. et al. |
| 4,215,289 | A | 7/1980 | De Hair et al. |
| 4,770,950 | A | 9/1988 | Ohnishi |
| 4,972,086 | A | 11/1990 | Bryan et al. |
| 5,032,316 | A | 7/1991 | Takahashi et al. |
| 5,433,295 | A | 7/1995 | Hao et al. |
| 5,472,636 | A | 12/1995 | Forster et al. |
| 5,518,808 | A | 5/1996 | Bruno et al. |
| 5,770,110 | A | 6/1998 | Schrell et al. |
| 5,770,111 | A | 6/1998 | Moriyama et al. |
| 5,853,614 | A | 12/1998 | Hao et al. |
| 5,952,681 | A | 9/1999 | Chen |
| 5,965,192 | A | 10/1999 | Potter |
| 5,998,925 | A | 12/1999 | Shimizu et al. |
| 6,045,722 | A | 4/2000 | Leblans et al. |
| 6,066,861 | A | 5/2000 | Hohn et al. |
| 6,084,250 | A | 7/2000 | Justel et al. |
| 6,373,184 | B1 | 4/2002 | Suh et al. |
| 6,472,765 | B1 | 10/2002 | Sano et al. |
| 6,482,664 | B1 | 11/2002 | Lee et al. |
| 6,565,771 | B1 | 5/2003 | Ono et al. |
| 6,670,751 | B2 | 12/2003 | Song et al. |
| 6,686,691 | B1 | 2/2004 | Mueller |
| 6,842,664 | B2 | 1/2005 | Harada |
| 6,982,045 | B2 | 1/2006 | Menkara et al. |
| 6,982,048 | B1 | 1/2006 | Atwater |
| 6,987,353 | B2 | 1/2006 | Menkara et al. |
| 7,019,335 | B2 | 3/2006 | Suenaga |
| 7,029,602 | B2 | 4/2006 | Oshio |
| 7,045,078 | B2* | 5/2006 | Choi ................. 252/301.4 R |
| 7,138,770 | B2 | 11/2006 | Uang |
| 7,189,340 | B2 | 3/2007 | Shimomura et al. |
| 7,206,507 | B2 | 4/2007 | Lee et al. |
| 7,229,571 | B2 | 6/2007 | Ezuhara et al. |
| 7,244,965 | B2 | 7/2007 | Andrews et al. |
| 7,332,746 | B1 | 2/2008 | Takahashi et al. |

(Continued)

FOREIGN PATENT DOCUMENTS

AT   410266   3/2003

(Continued)

OTHER PUBLICATIONS

International Search Report dated Feb. 11, 2009 for PCT Application No. PCT/2008/004733.
Butler, "Fluorescent Lamp Phosphors", The Pennsylvania State University Press, 1980, pp. 281-284.
Wanmaker, "Luminescence of Copper-Activated Orthophosphates of the Type ABPO (A=Ca,Sr or Ba and B=Li,Na or K)", Journal of the Electrochemical Society, pp. 109-113.
Shionoya, "Phosphor Handbook", edited under the auspiece of Phosphor Research Society, CRC Press, 1999, pp. 238-239, 241.
Van Gool, Philips Res. Rept. Suppl., 3, 1, 1961(pp. 1-9, 30-51, 84-85).
Wanmaker, "Luminescence of Copper-Activated Calcium and Strontium Orthophosphates", Journal of the Electrochemical Society, pp. 1027-1031.

(Continued)

*Primary Examiner* — Carol M Koslow
(74) *Attorney, Agent, or Firm* — H.C. Park & Associates, PLC

(57) ABSTRACT

This invention relates to luminescent materials for ultraviolet light or visible light excitation containing lead and/or copper doped chemical compounds. The luminescent material is composed of one or more than one compounds of aluminate type, silicate type, antimonate type, germanate/or germanate-silicate type, and/or phosphate type. Accordingly, the present invention is a good possibility to substitute earth alkaline ions by lead and copper for a shifting of the emission bands to longer or shorter wave length, respectively. Luminescent compounds containing copper and/or lead with improved luminescent properties and also with improved stability against water, humidity as well as other polar solvents are provided. The present invention is to provide lead and/or copper doped luminescent compounds, which has high color temperature range about 2,000K to 8,000K or 10,000K and CRI over 90.

6 Claims, No Drawings

U.S. PATENT DOCUMENTS

| | | |
|---|---|---|
| 7,468,147 B2 | 12/2008 | Shida et al. |
| 7,554,129 B2 | 6/2009 | Roth et al. |
| 7,608,200 B2 | 10/2009 | Seto et al. |
| 7,679,101 B2 | 3/2010 | Ota et al. |
| 7,679,281 B2 | 3/2010 | Kim et al. |
| 2002/0015013 A1 | 2/2002 | Ragle |
| 2003/0038295 A1 | 2/2003 | Koda |
| 2003/0168636 A1 | 9/2003 | Dobson et al. |
| 2004/0051111 A1 | 3/2004 | Ota et al. |
| 2004/0104391 A1 | 6/2004 | Maeda et al. |
| 2004/0135504 A1 | 7/2004 | Tamaki et al. |
| 2004/0136891 A1 | 7/2004 | Kijima et al. |
| 2004/0206970 A1 | 10/2004 | Martin |
| 2004/0251809 A1 | 12/2004 | Shimomura |
| 2005/0001225 A1 | 1/2005 | Yoshimura et al. |
| 2005/0001537 A1 | 1/2005 | West et al. |
| 2005/0029927 A1 | 2/2005 | Setlur et al. |
| 2005/0117334 A1 | 6/2005 | Lee et al. |
| 2005/0139846 A1 | 6/2005 | Park et al. |
| 2005/0141048 A1 | 6/2005 | Mizutani |
| 2005/0239227 A1 | 10/2005 | Aanegola et al. |
| 2005/0264161 A1 | 12/2005 | Oaku et al. |
| 2005/0274930 A1 | 12/2005 | Roth et al. |
| 2005/0274972 A1 | 12/2005 | Roth et al. |
| 2006/0076883 A1 | 4/2006 | Himaki et al. |
| 2006/0158090 A1 | 7/2006 | Wang et al. |
| 2006/0261309 A1 | 11/2006 | Li et al. |
| 2006/0261350 A1 | 11/2006 | Kawazoe et al. |
| 2006/0267042 A1 | 11/2006 | Izuno et al. |
| 2007/0029526 A1 | 2/2007 | Cheng et al. |
| 2007/0247051 A1 | 10/2007 | Kuze et al. |
| 2007/0284563 A1 | 12/2007 | Lee et al. |
| 2008/0036364 A1 | 2/2008 | Li et al. |
| 2008/0067472 A1 | 3/2008 | Roth et al. |
| 2008/0067920 A1 | 3/2008 | Roth et al. |
| 2008/0224163 A1 | 9/2008 | Roth et al. |
| 2009/0050847 A1 | 2/2009 | Xu et al. |
| 2009/0050849 A1 | 2/2009 | Lee et al. |
| 2009/0134413 A1 | 5/2009 | Roth et al. |
| 2009/0152496 A1 | 6/2009 | Roth et al. |
| 2009/0262515 A1 | 10/2009 | Lee et al. |
| 2009/0303694 A1 | 12/2009 | Roth et al. |
| 2010/0002454 A1 | 1/2010 | Lee et al. |
| 2010/0165645 A1 | 7/2010 | Lee et al. |
| 2010/0207132 A1 | 8/2010 | Lee et al. |

FOREIGN PATENT DOCUMENTS

| | | |
|---|---|---|
| CN | 1218084 | 6/1999 |
| CN | 1289454 | 3/2001 |
| CN | 1317537 | 10/2001 |
| CN | 1344777 | 4/2002 |
| CN | 1434521 | 8/2003 |
| DE | 10233050 | 2/2004 |
| DE | 10259946 | 7/2004 |
| EP | 0 094 132 | 11/1983 |
| EP | 0382295 | 8/1993 |
| EP | 0862794 | 9/1998 |
| EP | 0 896 994 | 2/1999 |
| EP | 1249873 | 10/2002 |
| EP | 1605030 | 12/2005 |
| EP | 2031038 | 3/2009 |
| GB | 1336053 | 11/1973 |
| GB | 2016034 | 9/1979 |
| JP | 31-1118 | 2/1956 |
| JP | 33-8177 | 9/1958 |
| JP | 38-6082 | 5/1963 |
| JP | 39-8803 | 5/1964 |
| JP | 47-6258 | 4/1972 |
| JP | 49-38994 | 10/1974 |
| JP | 55-135190 | 10/1980 |
| JP | 57-109886 | 7/1982 |
| JP | 61-258892 | 11/1986 |
| JP | 62-197487 | 9/1987 |
| JP | 5-78659 | 3/1993 |
| JP | 9-40946 | 2/1997 |
| JP | 9-153644 | 6/1997 |
| JP | 9-279140 | 10/1997 |
| JP | 2001-115157 | 4/2001 |
| JP | 2001-308393 | 11/2001 |
| JP | 2001-524163 | 11/2001 |
| JP | 2002-50795 | 2/2002 |
| JP | 2002-057376 | 2/2002 |
| JP | 2002-094122 | 3/2002 |
| JP | 2002-97466 | 4/2002 |
| JP | 2002-173677 | 6/2002 |
| JP | 2002-335019 | 11/2002 |
| JP | 2002-359403 | 12/2002 |
| JP | 2002-368277 | 12/2002 |
| JP | 2003-064358 | 3/2003 |
| JP | 2003-152229 | 5/2003 |
| JP | 2003-183649 | 7/2003 |
| JP | 2003-224306 | 8/2003 |
| JP | 2003-321675 | 11/2003 |
| JP | 2004-006582 | 1/2004 |
| JP | 2004-010786 | 1/2004 |
| JP | 2004-505470 | 2/2004 |
| JP | 2004-71726 | 3/2004 |
| JP | 2004-71807 | 3/2004 |
| JP | 2004-127988 | 4/2004 |
| JP | 2004-134699 | 4/2004 |
| JP | 2004-192833 | 7/2004 |
| JP | 2005-167177 | 6/2005 |
| JP | 2006-073656 | 3/2006 |
| JP | 2006-173433 | 6/2006 |
| JP | 2007-186674 | 7/2007 |
| JP | 2009-007545 | 1/2009 |
| KR | 10-232395 | 12/1999 |
| KR | 20010032450 | 4/2001 |
| KR | 10-2001-0050839 | 6/2001 |
| KR | 20010101910 | 11/2001 |
| KR | 10-2002-0000835 | 1/2002 |
| KR | 10-2002-0053975 | 7/2002 |
| KR | 10-392363 | 7/2002 |
| KR | 10-2002-0079513 | 10/2002 |
| KR | 2003-0063211 | 7/2003 |
| KR | 10-2003-0082395 | 10/2003 |
| KR | 10-0426034 | 7/2004 |
| KR | 10-2004-0088418 | 10/2004 |
| KR | 10-2005-0008426 | 1/2005 |
| KR | 10-2005-0070349 | 7/2005 |
| KR | 10-2005-0098462 | 10/2005 |
| KR | 10-2005-0106945 | 11/2005 |
| KR | 10-2005-0117164 | 12/2005 |
| KR | 10-2005-0117165 | 12/2005 |
| KR | 10-2006-0034056 | 4/2006 |
| KR | 10-0626272 | 9/2006 |
| KR | 10-2006-0134728 | 12/2006 |
| KR | 10-2007-0016900 | 2/2007 |
| KR | 10-2008-0046789 | 5/2008 |
| TW | 1328885 | 3/1999 |
| WO | 1996-32457 | 10/1996 |
| WO | 98-05078 | 2/1998 |
| WO | 98-12757 | 3/1998 |
| WO | 98-39805 | 9/1998 |
| WO | 98-42798 | 10/1998 |
| WO | 00-19546 | 4/2000 |
| WO | 01-41215 | 6/2001 |
| WO | 2002-054502 | 7/2002 |
| WO | 2002-054503 | 7/2002 |
| WO | 02-089219 | 11/2002 |
| WO | 03-021691 | 3/2003 |
| WO | 2004-85570 | 10/2004 |
| WO | 2004-111156 | 12/2004 |
| WO | 2005068584 | 7/2005 |
| WO | 2005-109532 | 11/2005 |
| WO | 2005-112137 | 11/2005 |
| WO | 2006-043682 | 4/2006 |
| WO | 2006-68359 | 6/2006 |
| WO | 2006-081803 | 8/2006 |
| WO | 2006109659 | 10/2006 |
| WO | 2007-035026 | 3/2007 |
| WO | 2007-055538 | 5/2007 |
| WO | 2007-069869 | 6/2007 |
| WO | 2007-114614 | 11/2007 |
| WO | 2009-028818 | 3/2009 |

OTHER PUBLICATIONS

Shionoya, "Phosphor Handbook", edited under the auspiece of Phosphor Research Society, CRC Press, 1999, pp. 204-205.
Blasse, "Radiationless Processes in Luminescent Materials", Radiationless Processes, 1980, pp. 287-289, 293.
Butler, "Fluorescent Lamp Phosphors", The Pennsylvania State University Press, 1980, pp. 181-182.
Butler, "Fluorescent Lamp Phosphors", The Pennsylvania State University Press, 1980, pp. 175-176.
Bernhardt, Investigations of the Orange Luminescence of PbMoO4 Crystals, Phys. Stat.Sol.(a),91,643,1985, pp. 643-647.
Shionoya, S., et al.(Eds.), "Principal phosphor materials and their optical properties" in Phosphor Handbook, CRC Press, 1999, p. 826.
Ralchenko, Yu., Kramida, A.E., Reader, J. and NIST ASD Team (2008). NIST Atomic Spectra Database (version 3.1.5), [Online]. Available: http://physics.nist.gov/asd3 [Feb. 27, 2009]. National Institute of Standards and Technology, Gaitherburg, MD.
Yang, "Conversion Fluorescence in Er3+Yb3+Co-Doped Oxy-Fluoride Compound Materials Based on GeO2," Natural Science Journal of Xiangtan University, vol. 23, No. 2, 2001, pp. 37-41.
International Search Report dated Feb. 27, 2009 for PCT Application No. PCT/KR2008/004734.
X.W.Sun, et al. "Pulsed Laser Deposition of Silicate Phosphor Thin Films", Appl. Phys. A, 69, 1999, 5 pages.
W.L. Wanmaker, et al. "Luminescence of Phosphors Based on the Host Lattice ABGe2O6(A,B=Ca,Sr,Ba)" Journal of Solid State Chemistry 3, (1971),pp. 194-196.
N. S. Akhmetov, "Inorganic Chemistry", Moscow "Vysshaya Shkola", 1975; (partial translation; translated pp. 332-3, 372-3, 384-5, 427, 432, 436, 445, 471, 476, 486, 491, 496-7, 501, 546-9).
Markovsky L, Ya. et al., Phosphors (Moscow-Leningrad, Khimiya Publishers, 1966, p. 7 (partial translation).
Joung Kyu Park, et al., "Silicate Phosphors for White LEDs Identified Through Combinatorial Chemistry", Electrochemical and Solid-State Letters, vol. 10(2), pp. J15-J18, (2007), XP-00251106706-11-12).
Joung Kyu Park, et al., "Luminescence Characteristics of Yellow Emitting Ba3SiO5:EU2+ Phosphor", Journal of Materials Science 40 (2005), pp. 2069-2071, XP-002511068.
H.G. Kang, et al., "Embodiment and Luminescence Properties of Sr3SiO5:Eu(yellow-orange phosphor) by co-doping lanthanide," Solid State Phenomena, vol. 124-126 (2007) pp. 511-514.
G. Roth, et al. "Advanced Silicate Phosphors for improved white LED", Global Phosphor Summit Seoul/Korea, Mar. 5-7, 2007.
T.L. Barry, "Equilibria and Eu2+ luminescence of subsolidus phases bounded by Ba3MgSi2O8, Sr3MgSi2O8 and Ca3MgSi2O8," J. Electrochem. Soc., vol. 115 No. 7 (Jul. 1968), pp. 733-738.
G. Blasse, et al., "Fluorescence of Europium2+-activated silicates," Philips Res. Repts 23 (1968), pp. 189-199.
S.D. Jee, et al., "Photoluminescence properties of Eu2+ -activated Sr3SiO5 Phosphors," J. Mater Sci. 41 (2006), pp. 3139-3141.
T.L. Barry, "Fluorescence of Eu2+ Activated Phases in Binary Alkaline Earth Orthosilicate Systems", J. Electrochem Soc., Nov. 1968, pp. 1181-1184.
Shenstone, A.G., "The Third Spectrum of Copper(Cu III)", Journal of Research of the National Bureau of Standards-A. Physics and Chemistry, vol. 79A, No. 3, May-Jun. 1975, pp. 497-521.
Lever, A.B.P., "Inorganic Electronic Spectroscopy", 2nd ed., Elsevier, 1984, pp. 355 and 557-559.
Dubicki, Lujcan et al., "The First d-d Fluorescence of a six-Coordinate Copper(II) Ion", J.Am.Chem.Soc., 1989, No. 111, pp. 3452-3454.
Scacco, A., et al., "Optical Spectra of Cu2+ Ions in LiF Crystals", Radiation Effects and Defects in Solids, vol. 134, 1995, pp. 333-336.
Shionoya, S., et al.(Eds.), "Principal phosphor materials and their optical properties" in Phosphor Handbook, CRC Press, 1999, pp. 231-255.
Yang, Ping et al., "Photoluminescence of Cu+ doped and Cu2+ doped ZnS nanocrystrallites", Journal of Physics and Chemistry of Solids, No. 63, 2002, pp. 639-643.
Suyver, J.F., et al.,"Luminescence of nanocrystalline ZnSe:Cu", Applied Physics Letters, vol. 79, No. 25, Dec.17, 2001, pp. 4222-4224.
Bol, Ageeth A., et al., "Luminescence of nanocrystalline ZnS:Cu2+", Journal of Luminescence, No. 99, 2002, pp. 325-334.
Non-final office action mailed May 23, 2007 for U.S. Appl. No. 11/024,722, filed Dec. 30, 2004.
Declaration under 37 CFR 1.132 by Ulrich Kynast, dated Aug. 24, 2007.
Final office action dated Oct. 22, 2007 issued in U.S. Appl. No. 11/024,722, filed Dec. 30, 2004.
"Phosphors for Mercury Lamps" https:/www.lamptech.co.uk/documents/M14%20Phosphors.htm 2003 (2 pages).
Search Report dated Apr. 11, 2006 for EP Application No. EP04106880.0.
International Search Report dated Aug. 12, 2005 for PCT Application No. PCT/KR2005/001287.
International Search Report dated Aug. 12, 2005 for PCT Application No. PCT/KR2005/001288.
International Search Report dated Oct. 13, 2005 for PCT Application No. PCT/KR2005/002333.
International Search Report dated Oct. 24, 2005 for PCT Application No. PCT/KR2005/002332.
International Search Report dated Feb. 20, 2007 for PCT Application No. PCT/KR2006/004716.
International Search Report dated Jul. 12, 2007 for PCT Application No. PCT/KR2007/001587.
International Search Report dated Mar. 21, 2007 for PCT Application No. PCT/KR2006/005500.
Chinese Office Action dated Feb. 15, 2008 issued in Chinese Patent App No. 20051002304.2 corresponding to U.S. Appl. No. 11/024,722.
Non-final office action dated Aug. 12, 2009 issued in U.S. Appl. No. 11/569,060, filed Jun. 22, 2007.
Chinese Office Action dated Dec. 28, 2007 issued in China App No. 2005800150173 corresponding to U.S. Appl. No. 11/569,060.
Notice of Allowance dated May 4, 2009 issued in U.S. Appl. No. 11/024,702.
Lee, Chung-Hoon, et al., Unpublished U.S. Appl. No. 12/440,001; corresponds to WO2009-028818.
Search Report dated Aug. 21, 2007 for EP Application No. EP04106882.6.
Search Report dated Nov. 5, 2008 for EP Application No. EP06812549.1.
Search Report dated Feb. 2, 2009 for EP Application No. EP08014684.
Chen, R., "Developments in Luminescence and Display Materials Over the Last 100 Years as reflected in Electrochemical Society Publications", Journal of Electrochemical Society, 149, pp. 69-78.
G. Blasse, B.C. Grabmeier, "Luminescent Materials", Springer, 1994, pp. 40-47.
G. Blasse and A. Bril, "Characteristic Luminescence", Philips Technical Review, 31 (1970) 304, pp. 306 & 310.
S. Shionoya, W.M. Yen, "Phosphor Handbook" CRC Press, 1999, Ch. 3.3, pp. 179-182.
G. Blasse, B.C. Grabmeier, "Luminescent Materials", Springer, 1994, p. 25.
J. Garcia Sole, L.E. Bausa, D. Jaque, "An Introduction to the Optical Spectroscopy of Inorganic Solids", Wiley, 2005, pp. 163-164.
P.A. Cox, "Transition Metal Oxides", Oxford University Press, 1995, p. 105.
G.L. Miessler, D.A. Tarr, "Inorganic Chemistry", 3rd ed., Pearson/Prentice Hall, pp. 117-118.
B. Cordero, et al. "Covalent Radii Revisited", Dalton Trans., (2008), pp. 2832-2838.
G. Blasse, B.C. Grabmeier, "Luminescent Materials", Springer, 1994, pp. 87-90.
Feldman, C., "Inorganic Luminescent Materials: 100 Years of Research and Application", Adv. Funct. Matter, 2003, pp. 511-516.
Blasse, G., "Characteristic Luminescence", Philips Technical Review, vol. 31 (1970), pp. 304-332.
Declaration Under Rule 37 CFR 1.132 of Ulrich Kynast dated Sep. 6, 2008.
Shionoya, "Phosphor Handbook", CRC Press, pp. 183-184.
Garcia Sole, et al., "An Introduction to the Optical Spectroscopy of Inorganic Solids", pp. 132-133.

R.J. Angel et al., "Structure and twinning of single-crystal MgSiO3 garnet synthesized at 17 GPa and 1800 °C", American Mineralogist, 74 (1989) pp. 509-512.

Lee, Chung-Hoon, et al., Unpublished U.S. Appl. No. 12/491,780.

Non-final office action dated Nov. 2, 2009 issued in U.S. Appl. No. 12/098,263, filed Apr. 4, 2008.

Non-final office action dated Nov. 14, 2008 issued in U.S. Appl. No. 11/024,722, filed Dec. 30, 2004.

Non-final office action dated May 29, 2009 issued in U.S. Appl. No. 11/024,722, filed Dec. 30, 2004.

Final office action dated Oct. 28, 2009 issued in U.S. Appl. No. 11/024,722, filed Dec. 30, 2004.

Non-final office action dated Nov. 29, 2006 issued in U.S. Appl. No. 11/024,722, filed Dec. 30, 2004.

Non-final office action dated Nov. 29, 2007 issued in U.S. Appl. No. 11/024,702, filed Dec. 30, 2004.

Non-final office action dated Jun. 22, 2006 issued in U.S. Appl. No. 11/024,702, filed Dec. 30, 2004.

Final office action dated Feb. 7, 2007 issued in U.S. Appl. No. 11/024,702, filed Dec. 30, 2004.

Chinese Office Action dated Dec. 28, 2007 issued in China App No. 200580016844.4 corresponding to U.S. Appl. No. 11/568,769.

Non-final office action dated Jan. 13, 2010 issued in U.S. Appl. No. 11/569,060, filed Jun. 22, 2007.

Non-final office action dated Nov. 17, 2009 issued in U.S. Appl. No. 12/097,741, filed Oct. 9, 2008.

Non-final office action dated Mar. 17, 2010 issued in U.S. Appl. No. 11/024,722.

Decision on Rejection issued Feb. 5, 2010 by the State Intellectual Property Office of the People's Republic of China in Chinese Application No. 2005100023042.

Non-Final Office Action dated Mar. 17, 2010 in U.S. Appl. No. 11/024,722.

Non-Final Office Action dated Aug. 10, 2010 in U.S. Appl. No. 11/024,722.

Non-Final Office Action dated Aug. 18, 2010 in U.S. Appl. No. 11/948,813.

Partial European Search Report of EP 10 17 7817 issued on Oct. 26, 2010, corresponding to U.S. Appl. No. 11/024,722.

European Search Report of Sep. 23, 2010 in European Patent Application No. 10 16 4970.

Austrian Office Action for AT Application No. 9514/2005 issued on Jun. 1, 2011.

Austrian Office Action for AT Application No. 1545/2010-1 issued on May 31, 2011.

International Search Report for PCT/KR2010/003285 issued on Jan. 24, 2011, corresponding to U.S. Appl. No. 12/773,514.

Non-Final Office Action of U.S. Appl. No. 13/004,554 issued on Mar. 15, 2011.

Notice of Allowance of U.S. Appl. No. 11/024,722 issued on Mar. 10, 2011.

Final Office Action of U.S. Appl. No. 12/196,923 issued on Mar. 4, 2011.

Notice of Allowance of U.S. Appl. No. 11/948,845 issued on Mar. 23, 2011.

Non-Final Office Action of U.S. Appl. No. 12/098,263 issued on Mar. 30, 2011.

Indian Office Action of Indian Application No. 2468/KOLNP/2007 issued on Jan. 28, 2011, corresponding to U.S. Appl. No. 12/098,263.

Non-Final Office Action of U.S. Appl. No. 12/854,001 issued on Apr. 6, 2011.

Non-Final Office Action of U.S. Appl. No. 12/440,001 issued on Apr. 27, 2011.

Bogner et al., DE 102 33 050 Al, Feb. 5, 2004, Machine Traslation.

Non-Final Office Action of U.S. Appl. No. 11/568,769 issued on Feb. 16, 2011.

TW Office Action of Sep. 10, 2010 in TW Patent Appl. No. 098123458.

IP Australia Office Action dated Jul. 2, 2010 for AU Patent Appl. No. 2005-319965, corresponding to U.S. Appl. No. 12/098,263.

Final Office Action dated Sep. 9, 2010 in U.S. Appl. No. 11/568,769.

Non-Final Office Action dated Apr. 30, 2010 in U.S. Appl. No. 11/568,769.

Final Office Action dated Jun. 21, 2010 in U.S. Appl. No. 11/569,060.

Final Office Action dated Nov. 12, 2010 in U.S. Appl. No. 12/097,741.

Non Final Office Action dated Jun. 16, 2010 in U.S. Appl. No. 12/097,741.

EP Search Report dated Oct. 6, 2010 in EP Appl No. 07745750.5—corresponding to U.S. Appl. No. 12/295,438.

EP Search Report dated Sep. 1, 2010 in EP Appl No. 08015119 correpsonding to U.S. Appl. No. 12/440,001.

Non Final Office Action dated Aug. 17, 2010 in U.S. Appl. No. 11/948,845.

Final Office Action dated May 11, 2010 in U.S. Appl. No. 12/098,263.

Notice of Allowance dated Aug. 18, 2010 in U.S. Appl. No. 12/098,263.

Non Final Office Action dated Nov. 30, 2010 in U.S. Appl. No. 12/196,923.

Final Office Action dated Nov. 30, 2010 in U.S. Appl. No. 11/024,722.

Non Final Office Action dated Nov. 24, 2010 in U.S. Appl. No. 12/093,441.

Non Final Office Action dated Nov. 26, 2010 in U.S. Appl. No. 12/440,001.

Final Office Action dated Dec. 7, 2010 in U.S. Appl. No. 11/948,845.

Final Office Action dated Dec. 23, 2010 in U.S. Appl. No. 11/569,060.

Final Office Action dated Dec. 8, 2010 in U.S. Appl. No. 11/948,813.

International Search Report for PCT/KR2010/003302 issued on Jan. 3, 2011, corresponding to U.S. Appl. No. 12/767,253.

Chinese Office Action of Chinese Patent Application No. 201010185274.4 issued on Mar. 2, 2011.

* cited by examiner

LUMINESCENT MATERIAL

CROSS REFERENCE TO RELATED APPLICATIONS

The present application is a continuation of U.S. patent application Ser. No. 11/024,722 filed on Dec. 30, 2004, and claims priority from and the benefit of Korean Patent Application No. 10-2004-0042397 filed on Jun. 10, 2004, all of which are hereby incorporated by reference for all purposes as if fully set forth herein.

BACKGROUND OF THE INVENTION

1. Field of the Invention

This invention relates generally to fluorescent materials containing rare earth elements and more particularly to such luminescent materials for exciting ultraviolet as well as visible light containing lead and/or copper doped compounds.

2. Description of the Related Art

Lead and copper activated materials are known for short wave excitation, e.g. from a low pressure mercury lamp, such as barium disilicate activated by lead (Keith H. Butler, The Pennsylvania State University Press, 1980, S 175, orthosilicate activated by lead (Keith H. Butler, The Pennsylvania State University Press, 1980, S. 181), akermanites activated by lead, or Ca-metasilicate activated by $Pb^{2+}$.

Generally, the maxima of the emission bands of such lead activated phosphors are located between 290 nm and 370 nm at 254 nm excitation. Bariumdisilicate activated by lead is an U.V. emitting phosphor which currently is used in sun parlor lamps.

Lead has in the ground state $^1S_0$ two outer electrons. The electron configuration of the ground state is $d^{10}s^2$, so that the lowest excited state has $d^{10}sp$ configuration. The excited sp configuration has four levels, $^3P_0$, $^3P_1$, $^3P_2$ and $^1P_1$, which can be achieved between 165.57 nm ($^3P_0$) and 104.88 nm ($^1P_1$) in the free ion. Transitions between $^1S_0$ and $^1P_1$ excited level are allowed by all selection rules. While transitions between $^1S_0$ and $^3P_0$ are only allowed with the lowest symmetry, transitions between $^1S_0$ and $^3P_1$ as well as $^3P_2$ are allowed only under certain conditions. However, excitation between 180 and 370 nm has the same emission. Excitation with wavelength longer than 370 nm is not possible.

Otherwise, luminescent materials are known having lead as a host lattice component. Molybdate phosphors containing $MoO_4^{2-}$ centers are described in Bernhardt, H. J., Phys. Stat. Sol. (a), 91, 643, 1985. $PbMoO_4$ shows at room temperature red emission with an emission maximum at 620 nm under photoexcitation at 360 nm.

However, such emission is not caused by lead itself. In molybdates the luminescence properties are not caused by the metal ion $M^{2+}$ ($M^{2+}MoO_4$ where $M^{2+}$=Ca, Sr, Cd, Zn, Ba, Pb etc). Here, defect centers of $MoO_4^{2-}$ ions coupled to $O^{2-}$-ion vacancies seem to be the reason. Nevertheless, the $Pb^{2+}$-ion influences the preferred emission properties because it stabilizes the host lattice.

As a familiar example, tungstates $(Ca,Pb)WO_4$ as mixed crystals have a strong green emission with high quantum output of 75% (Blasse, G, Radiationless processes in luminescent materials, in Radiationless Processes, DiBartolo, B., Ed. Plenum Press, New York, 1980, 287). Under 250 nm excitation $PbWO_4$ shows blue emission and under 313 nm excitation $PbWO_4$ has an orange emission band, which can be caused by Schottky defects or by impurity ions (Phosphor Handbook, edited under the Auspice of Phosphor Research Society, CRC Press New York, 1998, S 205).

Copper was used as a monovalent activator in orthophosphates (Wanmaker, W. L. and Bakker, C., J. Electrochem. Soc., 106, 1027, 1959) with an emission maximum at 490 nm. The ground state of monovalent copper is a filled shell $3d^{10}$. That is the level $^1S_0$. After exciting the lowest excited configuration is $3d^94s$. This configuration has two terms, $^3D$ and $^1D$. The next higher configuration, $3d^94p$, gives 6 terms $^3P°$, $^3F°$, $^3D°$, $^1F°$, $^1D°$ and $^1P°$. The transitions between the ground state $^1S_0$ and the $^1D$ or $^3D$ are forbidden by parity or spin, respectively. In copper ions, the excitation to the crystal field levels of 4p terms are allowed. Emission will be got either by a direct return from the crystal field odd state to the ground state or by a combination of transitions first from the odd state to a crystal field level and after that a second transition from these $^3D$ or $^1D$ state of the $3d^94s$ configuration to the ground state.

The ground state of bivalent copper has $3d^9$-configuration. That is the level $^2D_{5/2}$. In the bivalent copper, one of the d-electrons can be excited to the 4s or 4p orbital. The lowest exciting configuration is the $3d^84s$ with two quartet terms $^4F$, $^4P$ and four doublet terms, $^2F$, $^2D$, $^2P$ and $^2G$ without emission caused by forbidden transitions. The higher exciting configuration is the $3d^84p$-configuration with four terms $^4D°$, $^4G°$, $^4F°$, and $^4P°$, where emission can occur.

Copper activated or co-activated sulphide-phosphors are well known and they are commercial used for cathode ray tubes. The green-emitting ZnS:Cu, Al (wherein, the copper is used as activator and Al is used as co-activator) is very important in CRT applications.

In zinc-sulphide phosphors, the luminescent materials can be classified into five kinds, depending on the relative ratio of the concentration of activators and co-activators (van Gool, W., Philips Res. Rept. Suppl., 3, 1, 1961). Here, the luminescent centers are formed from deep donors or deep acceptors, or by their association at the nearest-neighbor sites (Phosphor Handbook, edited under the Auspice of Phosphor Research Society, CRC Press New York, 1998, S. 238).

Orthophosphates activated by copper (Wanmaker, W. L., and Spier, H. L., JECS 109 (1962), 109), and pyrophosphates, alumosilicates, silicates, and tripolyphosphates all activated by copper are described in "Keith H. Butler, The Pennsylvania State University Press, 1980, S. 281". However, such phosphors can only be used for a short wave U.V. excitation. Because of their unstable chemical properties and their temperature behavior, they cannot be used in fluorescent lamps.

The influence of lead and copper ions as host lattice component in oxygen dominated compounds, activated by rare earth ions such as $Eu^{2+}$, $Ce^{3+}$ and others, has not been yet described. It should to be expected that the incorporation of lead and/or copper as a host lattice component influences the preferred luminescent-optical properties regarding improved luminescent intensity as well as desirable shifting of emission maxima, color points, and shape of emission spectra and stabilizing of the lattice.

The influence of lead-ions and/or copper-ions as components in the host lattice should show improved luminescent properties for excitation wavelength higher than 360 nm. In this region of wavelength, both ions do not show own radiation transfers due to the energy levels of their electron configuration, so that any kind of exciting radiation cannot be lost.

Lead and copper doped luminescent materials show improved emission intensities compared to luminescent materials having not these components in the host lattice. Furthermore, as a desirable effect of lead and copper doped luminescent materials shows a shifting of the emission wavelength to higher or to lower energies. For compounds containing lead or copper, these ions do not react as activators in broadest sense. However, the use of these ions leads to an influence on the crystal field splitting as well as the covalency.

Lead ions having an ionic radius of 119 pm can substitute the alkaline earth ions Ca having an ionic radius of 100 pm and Sr having an ionic radius of 118 pm very easily. The electro negativity of lead with 1.55 is much higher than that of Ca (1.04) and Sr (0.99). The preparation of substances containing lead is complicated due to the possibility of an oxidation of these ions in reducing atmospheres. For the preparation of lead doped compounds, which need reducing atmosphere, special preparation processes are necessary.

The influence on lead in the crystal field is shown in a generally shifting the emission characteristics depending on the substituted ions. In cases of a substitution of Pb for Sr or Ba in Eu-activated aluminates and/or silicates, the emission maximum should be shifted to longer wavelength due to smaller ionic radii of Pb compared with Ba and Sr ionic radii. That leads to a stronger crystal field in the surrounding of the activator ion.

A similar effect shows the substitution of copper for alkaline earth ions. Here, an additional influence is effective. Due to the higher ionic potential of copper as a quotient of ionic charge and ionic radius compared to the bigger alkaline earth ions, the copper ions can attract the neighboring oxygen ions stronger than the alkaline earth ions. So the substitution of the bigger alkaline earth ions Ca, Sr and Ba by copper leads to a stronger crystal field in the surrounding of the activator ions, too. Thus, the shape of emission bands can be influenced, the shifting of the emission peak to longer wavelength is connected in a broadening of the emission curves for band emission. In addition, it should be possible to increase the intensity of emission by substitution of ions copper and lead. Generally, the shifts of emission peaks to longer as well as to shorter wavelength are desirable in the field of LED lighting. Here, it is necessary to realize a fine tuning to get a special wavelength for desired color points as well as for better brightness of optical devices. By using cations, copper and lead, such a fine tuning should be possible.

It is known that some luminescent materials and phosphors are unstable in water, air humidity, water steam or polar solvents. For instance, aluminates with spinell structure or silicates with orthorhomcic as well as akermanite structures show more or less high sensitivity to water, air humidity, water steam or polar solvents due to high basicity. However, due to a higher covalency and a lower basicity, the incorporation of lead and or copper in a host lattice should improve this behavior of luminescent materials against water, air humidity and polar solvents if substituted for cations having a high basicity.

SUMMARY OF THE INVENTION

In view of the prior art described above, it is an object of the present invention to provide lead and/or copper doped luminescent materials which have a very good possibility to substitute earth alkaline ions by lead and copper with a shifting of the emission bands to longer or shorter wave length, respectively.

Another object of the present invention is to provide luminescent materials containing copper and/or lead with improved luminescent properties and also with improved stability against water, humidity as well as other polar solvents.

An additional object of the present invention is to provide lead and/or copper doped luminescent materials, which give high color temperature range about 2,000K to 8,000K or 10,000K and CRI over 90 in LED.

To achieve these and other objects, as embodied and broadly described herein, luminescent materials for ultraviolet light or visible light excitation comprises lead and/or copper doped chemical compounds containing a rare earth element or other luminescent ions.

The luminescent materials may be composed of one or more compounds of aluminate, silicate, antimonate, germanate/or germanate-silicate, and phosphate.

The aluminate is expressed as follows:

$$a(M'O).b(M''_2O).c(M'''X).dAl_2O_3.e(M''''O).f(M''''_2O_3).g(M''''_oO_p).h(M''''_xO_y)$$

$$a(M'O).b(M''_2O).c(M'''X).4\text{-}a\text{-}b\text{-}c(M''''O).7(Al_2O_3).d(B_2O_3).e(Ga_2O_3).f(SiO_2).g(GeO_2).h(M''''_xO_y)$$

and $$a(M'O).b(M''O).c(Al_2O_3).d(M'''_2O_3).e(M''''O_2).f(M''''_xO_y)$$

The silicate is expressed as follows:

$$a(M'O).b(M''O).c(M'''X).d(M''''O_2).e(M''''_2O_3).f(M''''_oO_p).g(SiO_2).h(M''''_xO_y)$$

The antimonate is expressed as follows:

$$a(M'O).b(M''_2O).c(M'''X).d(Sb_2O_5).e(M''''O).f(M''''_xO_y)$$

The germanate/or germanate-silicate is expressed as follows:

$$a(M'O).b(M''_2O).c(M'''X).dGeO_2.e(M''''O).f(M''''_2O_3).g(M''''_oO_p).h(M''''_xO_y)$$

The phosphate is expressed as follows:

$$a(M'O).b(M''_2O).c(M'''X).dP_2O_5.e(M''''O).f(M''''_2O_3).g(M''''_2O_2).h(M''''_xO_y)$$

Meanwhile, the luminescent materials may be used as a converter for the primary long-wave ultraviolet in the range of 300-400 nm and/or blue radiation in the range of 380-500 nm generated from one or more single primary elements within a light emitting device to produce light in the visible region of the spectrum up to a high color rendering index Ra>90.

Furthermore, the luminescent materials may be used in LED as a single compound and/or a mixture of a plurality of single compounds for realizing white light with a color rendering up to Ia.

DETAILED DESCRIPTION OF THE PREFERRED EMBODIMENT

Hereinafter, the present invention will be described in detail.

Example 1

Luminescent materials for ultraviolet light or visible light excitation comprise lead and/or copper doped aluminates according to the formula as follows:

$$a(M'O).b(M''_2O).c(M'''X).dAl_2O_3.e(M''''O).f(M''''_2O_3).g(M''''_oO_p).h(M''''_xO_y) \quad (1)$$

wherein M' may be Pb, Cu, and/or any combination thereof; M'' may be one or more monovalent elements, for example, Li, Na, K, Rb, Cs, Au, Ag, and/or any combination thereof; M''' may be one or more divalent elements, for example, Be, Mg, Ca, Sr, Ba, Zn, Cd, Mn, and/or any combination thereof; M'''' may be one or more trivalent elements, for example, Sc, B, Ga, In, and/or any combination thereof; M''''' may be Si, Ge, Ti, Zr, Mn, V, Nb, Ta, W, Mo, and/or any combination thereof; M'''''' may be Bi, Sn, Sb, Sc, Y, La, Ce, Pr, Nd, Pm, Sm, Eu, Gd, Tb, Dy, Ho, Er, Tm, Yb, Lu, and/or any combination thereof; X may be F, Cl, Br, I, and/or any combination thereof; 0<a≦2; 0≦b≦2; 0≦c≦2; 0<d≦8; 0<e≦4; 0≦f≦3; 0≦g≦8; 0<h≦2; 1≦o≦2; 1≦p≦5; 1≦x≦2; and 1≦y≦5.

$$a(M'O).b(M''_2O).c(M'''X).4\text{-}a\text{-}b\text{-}c(M''''O).7(Al_2O_3).d(B_2O_3).e(Ga_2O_3).f(SiO_2).g(GeO_2).h(M''''_xO_y) \quad (2)$$

wherein M' may be Pb, Cu, and/or any combination thereof; M'' may be one or more monovalent elements, for example, Li, Na, K, Rb, Cs, Au, Ag, and/or any combination thereof; M''' may be one or more divalent elements, for example, Be, Mg, Ca, Sr, Ba, Zn, Cd, Mn, and/or any combination thereof; M'''' may be Bi, Sn, Sb, Sc, Y, La, In, Ce, Pr, Nd, Pm, Sm, Eu, Gd, Tb, Dy, Ho, Er, Tm, Yb, Lu, and any combination thereof; X may be F; Cl, Br, J, and any combination thereof; 0<a≦4; 0≦b≦2; 0≦c≦2; 0≦d≦1; 0≦e≦1; 0≦f≦1; 0≦g≦1; 0<h≦2; 1≦x≦2; and 1≦y≦5.

The preparation of copper as well as lead doped luminescent materials may be a basic solid state reaction. Pure starting materials without any impurities, e.g. iron, may be used. Any starting material which may transfer into oxides via a heating process may be used to form oxygen dominated phosphors.

Examples of Preparation

Preparation of the luminescent material having formula (3)

$$Cu_{0.02}Sr_{3.98}Al_{14}O_{25}:Eu \quad (3)$$

Starting materials: CuO, SrCO$_3$, Al(OH)$_3$, Eu$_2$O$_3$, and/or any combination thereof.

The starting materials in the form of oxides, hydroxides, and/or carbonates may be mixed in stoichiometric proportions together with small amounts of flux, e.g., H$_3$BO$_3$. The mixture may be fired in an alumina crucible in a first step at about 1,200° C. for about one hour. After milling the pre-fired materials a second firing step at about 1,450° C. in a reduced atmosphere for about 4 hours may be followed. After that the material may be milled, washed, dried and sieved. The resulting luminescent material may have an emission maximum of about 494 nm.

TABLE 1 copper doped Eu$^{2+}$-activated aluminate compared with Eu$^{2+}$-activated aluminate without copper at about 400 nm excitation wavelength

|  | Copper doped compound $Cu_{0.02}Sr_{3.98}Al_{14}O_{25}$:Eu | Compound without copper $Sr_4Al_{14}O_{25}$:Eu |
|---|---|---|
| Luminous density (%) | 103.1 | 100 |
| Wavelength (nm) | 494 | 493 |

Preparation of the luminescent material having formula (4)

$$Pb_{0.05}Sr_{3.95}Al_{14}O_{25}:Eu \quad (4)$$

Starting materials: PbO, SrCO$_3$, Al$_2$O$_3$, Eu$_2$O$_3$, and/or any combination thereof.

The starting materials in form of very pure oxides, carbonates, or other components which may decompose thermically into oxides, may be mixed in stoichiometric proportion together with small amounts of flux, for example, H$_3$BO$_3$. The mixture may be fired in an alumina crucible at about 1,200° C. for about one hour in the air. After milling the pre-fired materials a second firing step at about 1,450° C. in air for about 2 hours and in a reduced atmosphere for about 2 hours may be followed. Then the material may be milled, washed, dried, and sieved. The resulting luminescent material may have an emission maximum of from about 494.5 nm.

TABLE 2 lead doped Eu$^{2+}$-activated aluminate compared with Eu$^{2+}$-activated aluminate without lead at about 400 nm excitation wavelength

|  | Lead doped compound $Pb_{0.05}Sr_{3.95}Al_{14}O_{25}$:Eu | Compound without lead $Sr_4Al_{14}O_{25}$:Eu |
|---|---|---|
| Luminous density (%) | 101.4 | 100 |
| Wavelength (nm) | 494.5 | 493 |

TABLE 3 optical properties of some copper and/or lead doped aluminates excitable by long wave ultraviolet and/or by visible light and their luminous density in % at 400 nm excitation wavelength

| Composition | Possible excitation range(nm) | Luminous density at 400 nm excitation compared with copper/lead not doped compounds (%) | Peak wave length of lead/copper doped materials (nm) | Peak wave length of materials without lead/copper(nm) |
|---|---|---|---|---|
| $Cu_{0.5}Sr_{3.5}Al_{14}O_{25}$:Eu | 360-430 | 101.2 | 495 | 493 |
| $Cu_{0.02}Sr_{3.98}Al_{14}O_{25}$:Eu | 360-430 | 103.1 | 494 | 493 |
| $Pb_{0.05}Sr_{3.95}Al_{14}O_{25}$:Eu | 360-430 | 101.4 | 494.5 | 493 |
| $Cu_{0.01}Sr_{3.99}Al_{13.995}Si_{0.005}O_{25}$:Eu | 360-430 | 103 | 494 | 492 |
| $Cu_{0.01}Sr_{3.395}Ba_{0.595}Al_{14}O_{25}$:Eu, Dy | 360-430 | 100.8 | 494 | 493 |
| $Pb_{0.05}Sr_{3.95}Al_{13.95}Ga_{0.05}O_{25}$:Eu | 360-430 | 101.5 | 494 | 494 |

Example 2

Luminescent materials for ultraviolet light or visible light excitation comprise lead and/or copper doped aluminates according to the formula as follows:

$$a(M'O).b(M''O).c(Al_2O_3).d(M'''_2O_3).e(M''''O_2).f(M'''''_xO_y) \quad (5)$$

wherein M' may be Pb, Cu, and/or any combination thereof; M'' may be Be, Mg, Ca, Sr, Ba, Zn, Cd, Mn, and/or any combination thereof; M''' may be B, Ga, In, and/or any combination thereof; M'''' may be Si, Ge, Ti, Zr, Hf, and/or any combination thereof; M''''' may be Bi, Sn, Sb, Sc, Y, La, Ce, Pr, Nd, Pm, Sm, Eu, Gd, Tb, Dy, Ho, Er, Tm, Yb, Lu, and/or any combination thereof; $0<a\leq1$; $0\leq b\leq2$; $0<c\leq8$; $0\leq d\leq1$; $0\leq e\leq1$; $0<f\leq2$; $1\leq x\leq2$; and $1\leq y\leq5$.

The luminous peak and density of Example 2 are described in Table 7, which will be shown below.

Example of Preparation

Preparation of the luminescent material having formula (6)

$$Cu_{0.05}Sr_{0.95}Al_{1.9997}Si_{0.0003}O_4:Eu \quad (6)$$

Starting materials: CuO, SrCO$_3$, Al$_2$O$_3$, SiO$_2$, Eu$_2$O$_3$, and/or any combination thereof.

The starting materials in the form of, for example, pure oxides and/or as carbonates may be mixed in stoichiometric proportions together with small amounts of flux, for example, AlF$_3$. The mixture may be fired in an alumina crucible at about 1,250° C. in a reduced atmosphere for about 3 hours. After that the material may be milled, washed, dried and sieved. The resulting luminescent material may have an emission maximum of about 521.5 nm.

TABLE 4 copper doped $Eu^{2+}$-activated aluminate compared with $Eu^{2+}$-activated aluminate without copper at about 400 nm excitation wavelength

|  | Copper doped compound $Cu_{0.05}Sr_{0.95}Al_{1.9997}Si_{0.0003}O_4$:Eu | Compound without copper $SrAl_2O_4$:Eu |
|---|---|---|
| Luminous density (%) | 106 | 100 |
| Wavelength (nm) | 521.5 | 519 |

Preparation of the luminescent material having formula (7)

$$Cu_{0.12}BaMg_{1.88}Al_{16}O_{27}:Eu \quad (7)$$

Starting materials: CuO, MgO, $BaCO_3$, $Al(OH)_3$, $Eu_2O_3$, and/or any combination thereof.

The starting materials in the form of, for example, pure oxides, hydroxides, and/or carbonates may be mixed in stoichiometric proportions together with small amounts of flux, for example, $AlF_3$. The mixture may be fired in an alumina crucible at about 1,420° C. in a reduced atmosphere for about 2 hours. After that the material may be milled, washed, dried, and sieved. The resulting luminescent material may have an emission maximum of about 452 nm.

ric proportions together with small amounts of flux, for example, $H_3BO_3$. The mixture may be fired in an alumina crucible at about 1,000° C. for about 2 hours in the air. After milling the pre-fired materials a second firing step at about 1,420° C. in the air for about 1 hour and in a reduced atmosphere for about 2 hours may be followed. After that the material may be milled, washed, dried and sieved. The resulting luminescent material may have an emission maximum of about 521 nm.

TABLE 6 lead doped $Eu^{2+}$-activated aluminate compared with $Eu^{2+}$-activated aluminate without lead at about 400 nm excitation wavelength

|  | Lead doped compound $Pb_{0.1}Sr_{0.9}Al_2O_4$:Eu | Compound without lead $SrAl_2O_4$:Eu |
|---|---|---|
| Luminous density (%) | 102 | 100 |
| Wavelength (nm) | 521 | 519 |

Results obtained in regard to copper and/or lead doped aluminates are shown in table 7.

TABLE 7 optical properties of some copper and/or lead doped aluminates excitable by long wave ultraviolet and/or by visible light and their luminous density in % at 400 nm excitation wavelength

| Composition | Possible excitation range (nm) | Luminous density at 400 nm excitation compared with copper/lead not doped compounds (%) | Peak wave length of lead/copper doped materials (nm) | Peak wave length of materials without lead/copper (nm) |
|---|---|---|---|---|
| $Cu_{0.05}Sr_{0.95}Al_{1.9997}Si_{0.0003}O_4$:Eu | 360-440 | 106 | 521.5 | 519 |
| $Cu_{0.2}Mg_{0.7995}Li_{0.0005}Al_{1.9}Ga_{0.1}O_4$:Eu, Dy | 360-440 | 101.2 | 482 | 480 |
| $Pb_{0.1}Sr_{0.9}Al_2O_4$:Eu | 360-440 | 102 | 521 | 519 |
| $Cu_{0.05}BaMg_{1.95}Al_{16}O_{27}$:Eu, Mn | 360-400 | 100.5 | 451, 515 | 450, 515 |
| $Cu_{0.12}BaMg_{1.88}Al_{16}O_{27}$:Eu | 360-400 | 101 | 452 | 450 |
| $Cu_{0.01}BaMg_{0.99}Al_{10}O_{17}$:Eu | 360-400 | 102.5 | 451 | 449 |
| $Pb_{0.1}BaMg_{0.9}Al_{9.5}Ga_{0.5}O_{17}$:Eu, Dy | 360-400 | 100.8 | 448 | 450 |
| $Pb_{0.08}Sr_{0.902}Al_2O_4$:Eu, Dy | 360-440 | 102.4 | 521 | 519 |
| $Pb_{0.2}Sr_{0.8}Al_2O_4$:Mn | 360-440 | 100.8 | 658 | 655 |
| $Cu_{0.06}Sr_{0.94}Al_2O_4$:Eu | 360-440 | 102.3 | 521 | 519 |
| $Cu_{0.05}Ba_{0.94}Pb_{0.06}Mg_{0.95}Al_{10}O_{17}$:Eu | 360-440 | 100.4 | 451 | 449 |
| $Pb_{0.3}Ba_{0.7}Cu_{0.1}Mg_{1.9}Al_{16}O_{27}$:Eu | 360-400 | 100.8 | 452 | 450 |
| $Pb_{0.3}Ba_{0.7}Cu_{0.1}Mg_{1.9}Al_{16}O_{27}$:Eu, Mn | 360-400 | 100.4 | 452, 515 | 450, 515 |

TABLE 5 copper doped $Eu^{2+}$-activated aluminate compared with copper not doped $Eu^{2+}$-activated aluminate at 400 nm excitation wavelength

|  | Copper doped compound $Cu_{0.12}BaMg_{1.88}Al_{16}O_{27}$:Eu | Comparison without copper $BaMg_2Al_{16}O_{27}$:Eu |
|---|---|---|
| Luminous density (%) | 101 | 100 |
| Wavelength (nm) | 452 | 450 |

Preparation of the luminescent material having formula (8)

$$Pb_{0.1}Sr_{0.9}Al_2O_4:Eu \quad (8)$$

Starting materials: PbO, $SrCO_3$, $Al(OH)_3$, $Eu_2O_3$, and/or any combination thereof.

The starting materials in form of, for example, pure oxides, hydroxides, and/or carbonates may be mixed in stoichiomet-

Example 3

Luminescent materials for ultraviolet light or visible light excitation comprise lead and/or copper doped silicates according to the formula as follows:

$$a(M'O).b(M''O).c(M'''X).d(M'''_2O).e(M''''_2O_3).f(M'''''_2O_p).g(SiO_2).h(M''''''_xO_y) \quad (9)$$

wherein M' may be Pb, Cu, and/or any combination thereof; M'' may be Be, Mg, Ca, Sr, Ba, Zn, Cd, Mn, and/or any combination thereof; M''' may be Li, Na, K, Rb, Cs, Au, Ag, and/or any combination thereof; M'''' may be Al, Ga, In, and/or any combination thereof; M''''' may be Ge, V, Nb, Ta, W, Mo, Ti, Zr, Hf, and/or any combination thereof; M'''''' may be Bi, Sn, Sb, Sc, Y, La, Ce, Pr, Nd, Pm, Sm, Eu, Gd, Tb, Dy, Ho, Er, Tm, Yb, Lu, and/or any combination thereof; X may be F, Cl, Br, I, and any combination thereof; $0<a\leqq2$; $0<b\leqq8$;

$0 \leq c \leq 4$; $0 \leq d \leq 2$; $0 \leq e \leq 2$; $0 \leq f \leq 2$; $0 < g \leq 10$; $0 < h \leq 5$; $1 \leq o \leq 2$; $1 \leq p \leq 5$; $1 \leq x \leq 2$; and $1 \leq y \leq 5$.

The superior luminous density of Example 3 can be seen below.

Example of Preparation

Preparation of the luminescent material having formula (10)

$$Cu_{0.05}Sr_{1.7}Ca_{0.25}SiO_4:Eu \qquad (10)$$

Starting materials: CuO, SrCO$_3$, CaCO$_3$, SiO$_2$, Eu$_2$O$_3$, and/or any combination thereof.

The starting materials in the form of pure oxides and/or carbonates may be mixed in stoichiometric proportions together with small amounts of flux, for example, NH$_4$Cl. The mixture may be fired in an alumina crucible at about 1,200° C. in an inert gas atmosphere (e.g., N$_2$ or noble gas) for about 2 hours. Then the material may be milled. After that, the material may be fired in an alumina crucible at about 1,200° C. in a slightly reduced atmosphere for about 2 hours. Then, the material may be milled, washed, dried, and sieved. The resulting luminescent material may have an emission maximum at about 592 nm.

TABLE 8 copper doped Eu$^{2+}$-activated silicate compared with Eu$^{2+}$-activated silicate without copper at about 400 nm excitation wavelength

|  | Copper doped compound $Cu_{0.05}Sr_{1.7}Ca_{0.25}SiO_4:Eu$ | Compound without copper $Sr_{1.7}Ca_{0.3}SiO_4:Eu$ |
|---|---|---|
| Luminous density (%) | 104 | 100 |
| Wavelength (nm) | 592 | 588 |

Preparation of the luminescent material having formula (11):

$$Cu_{0.2}Ba_2Zn_{0.2}Mg_{0.6}Si_2O_7:Eu \qquad (11)$$

Starting materials: CuO, BaCO$_3$, ZnO, MgO, SiO$_2$, Eu$_2$O$_3$, and/or any combination thereof.

The starting materials in the form of very pure oxides and carbonates may be mixed in stoichiometric proportions together with small amounts of flux, for example, NH$_4$Cl. In a first step the mixture may be fired in an alumina crucible at about 1,100° C. in a reduced atmosphere for about 2 hours. Then the material may be milled. After that the material may be fired in an alumina crucible at about 1,235° C. in a reduced atmosphere for about 2 hours. Then that the material may be milled, washed, dried and sieved. The resulting luminescent material may have an emission maximum at about 467 nm.

TABLE 9 copper doped Eu$^{2+}$-activated silicate compared with Eu$^{2+}$-activated silicate without copper at 400 nm excitation wavelength

|  | Copper doped compound $Cu_{0.2}Sr_2Zn_{0.2}Mg_{0.6}Si_2O_7:Eu$ | Compound without copper $Sr_2Zn_2Mg_{0.6}Si_2O_7:Eu$ |
|---|---|---|
| Luminous density (%) | 101.5 | 100 |
| Wavelength (nm) | 467 | 465 |

Preparation of the luminescent material having formula (12)

$$Pb_{0.1}BaO_{0.95}Sr_{0.95}Si_{0.998}Ge_{0.002}O_4:Eu \qquad (12)$$

Starting materials: PbO, SrCO$_3$, BaCO$_3$, SiO$_2$, GeO$_2$, Eu$_2$O$_3$, and/or any combination thereof.

The starting materials in the form of oxides and/or carbonates may be mixed in stoichiometric proportions together with small amounts of flux, for example, NH$_4$Cl. The mixture may be fired in an alumina crucible at about 1,000° C. for about 2 hours in the air. After milling the pre-fired materials a second firing step at 1,220° C. in air for 4 hours and in reducing atmosphere for 2 hours may be followed. After that the material may be milled, washed, dried and sieved. The resulting luminescent material may have an emission maximum at about 527 nm.

TABLE 10 lead doped Eu$^{2+}$-activated silicate compared with Eu$^{2+}$-activated silicate without lead at about 400 nm excitation wavelength

|  | Lead doped compound $Pb_{0.1}Ba_{0.95}Sr_{0.95}Si_{0.998}Ge_{0.002}O_4:Eu$ | Compound without lead $BaSrSiO_4:Eu$ |
|---|---|---|
| Luminous density (%) | 101.3 | 100 |
| Wavelength (nm) | 527 | 525 |

Preparation of the luminescent material having formula (13)

$$Pb_{0.25}Sr_{3.75}Si_3O_8Cl_4:Eu \qquad (13)$$

Starting materials: PbO, SrCO$_3$, SrCl$_2$, SiO$_2$, Eu$_2$O$_3$, and any combination thereof.

The starting materials in the form of oxides, chlorides, and/or carbonates may be mixed in stoichiometric proportions together with small amounts of flux, for example, NH$_4$Cl. The mixture may be fired in an alumina crucible in a first step at about 1,100° C. for about 2 hours in the air. After milling the pre-fired materials a second firing step at about 1,220° C. in the air for about 4 hours and in a reduced atmosphere for about 1 hour may be followed. After that the material may be milled, washed, dried and sieved. The resulting luminescent material may have an emission maximum at about 492 nm.

TABLE 11 lead doped Eu$^{2+}$-activated chlorosilicate compared with Eu$^{2+}$-activated chlorosilicate without lead at 400 nm excitation wavelength

|  | Lead doped compound $Pb_{0.25}Sr_{3.75}Si_3O_8Cl_4:Eu$ | Compound without lead $Sr_4Si_3O_8Cl_4:Eu$ |
|---|---|---|
| Luminous density (%) | 100.6 | 100 |
| Wavelength (nm) | 492 | 490 |

Results obtained with respect to copper and/or lead doped silicates are shown in table 12.

TABLE 12 optical properties of some copper and/or lead doped rare earth activated silicates excitable by long wave ultraviolet and/or by visible light and their luminous density in % at about 400 nm excitation wavelength

| Composition | Possible excitation range (nm) | Luminous density at 400 nm excitation compared with copper/lead not doped compounds (%) | Peak wave length of lead/copper doped materials (nm) | Peak wave length of materials without lead/copper (nm) |
|---|---|---|---|---|
| $Pb_{0.1}Ba_{0.95}Sr_{0.95}Si_{0.998}Ge_{0.002}O_4$:Eu | 360-470 | 101.3 | 527 | 525 |
| $Cu_{0.02}(Ba,Sr,Ca,Zn)_{1.98}SiO_4$:Eu | 360-500 | 108.2 | 565 | 560 |
| $Cu_{0.05}Sr_{1.7}Ca_{0.25}SiO_4$:Eu | 360-470 | 104 | 592 | 588 |
| $Cu_{0.05}Li_{0.002}Sr_{1.5}Ba_{0.448}SiO_4$:Gd, Eu | 360-470 | 102.5 | 557 | 555 |
| $Cu_{0.2}Sr_2Zn_{0.2}Mg_{0.6}Si_2O_7$:Eu | 360-450 | 101.5 | 467 | 465 |
| $Cu_{0.02}Ba_{2.8}Sr_{0.2}Mg_{0.98}Si_2O_8$:Eu, Mn | 360-420 | 100.8 | 440, 660 | 438, 660 |
| $Pb_{0.25}Sr_{3.75}Si_3O_8Cl_4$:Eu | 360-470 | 100.6 | 492 | 490 |
| $Cu_{0.2}Ba_{2.2}Sr_{0.75}Pb_{0.05}Zn_{0.8}Si_2O_8$:Eu | 360-430 | 100.8 | 448 | 445 |
| $Cu_{0.2}Ba_3Mg_{0.8}Si_{1.99}Ge_{0.01}O_8$:Eu | 360-430 | 101 | 444 | 440 |
| $Cu_{0.5}Zn_{0.5}Ba_2Ge_{0.2}Si_{1.8}O_7$:Eu | 360-420 | 102.5 | 435 | 433 |
| $Cu_{0.8}Mg_{0.2}Ba_3Si_2O_8$:Eu, Mn | 360-430 | 103 | 438, 670 | 435, 670 |
| $Pb_{0.15}Ba_{1.84}Zn_{0.01}Si_{0.99}Zr_{0.01}O_4$:Eu | 360-500 | 101 | 512 | 510 |
| $Cu_{0.2}Ba_5Ca_{2.8}Si_4O_{16}$:Eu | 360-470 | 101.8 | 495 | 491 |

Example 4

Luminescent materials for ultraviolet light or visible light excitation comprise lead and/or copper doped antimonates according to the formula as follows:

$$a(M'O).b(M''_2O).c(M'X).d(Sb_2O_5).e(M'''O).f(M''''_xO_y) \quad (14)$$

wherein M' may be Pb, Cu, and/or any combination thereof; M'' may be Li, Na, K, Rb, Cs, Au, Ag, and/or any combination thereof; M''' may be Be, Mg, Ca, Sr, Ba, Zn, Cd, Mn, and/or any combination thereof; M'''' may be Bi, Sn, Sc, Y, La, Pr, Sm, Eu, Tb, Dy, Gd, and/or any combination thereof; X may be F, Cl, Br, I, and/or any combination thereof; $0<a\leq2$; $0\leq b\leq2$; $0\leq c\leq4$; $0\leq d\leq8$; $0\leq e\leq8$; $0<f\leq2$; $1\leq x\leq2$; and $1\leq y\leq5$.

Examples of Preparation

Preparation of the luminescent material having formula (15)

$$Cu_{0.2}Mg_{1.7}Li_{0.2}Sb_2O_7:Mn \quad (15)$$

Starting materials: CuO, MgO, $Li_2O$, $Sb_2O_5$, $MnCO_3$, and/or any combination thereof.

The starting materials in the form of oxides may be mixed in stoichiometric proportion together with small amounts of flux. In a first step the mixture may be fired in an alumina crucible at about 985° C. in the air for about 2 hours. After pre-firing the material may be milled again. In a second step the mixture may be fired in an alumina crucible at about 1,200° C. in an atmosphere containing oxygen for about 8 hours. After that the material may be milled, washed, dried and sieved. The resulting luminescent material may have an emission maximum at about 626 nm.

TABLE 13 copper doped antimonate compared with antimonate without copper at about 400 nm excitation wavelength

| | Copper doped compound $Cu_{0.2}Mg_{1.7}Li_{0.2}Sb_2O_7$:Mn | Comparison without copper $Mg_2Li_{0.2}Sb_2O_7$:Mn |
|---|---|---|
| Luminous density (%) | 101.8 | 100 |
| Wavelength (nm) | 652 | 650 |

Preparation of the luminescent material having formula (16)

$$Pb_{0.006}Ca_{0.6}Sr_{0.394}Sb_2O_6 \quad (16)$$

Starting materials: PbO, $CaCO_3$, $SrCO_3$, $Sb_2O_5$, and/or any combination thereof.

The starting materials in the form of oxides and/or carbonates may be mixed in stoichiometric proportions together with small amounts of flux. In a first step the mixture may be fired in an alumina crucible at about 975° C. in the air for about 2 hours. After pre-firing the material may be milled again. In a second step the mixture may be fired in an alumina crucible at about 1,175° C. in the air for about 4 hours and then in an oxygen-containing atmosphere for about 4 hours. After that the material may be milled, washed, dried and sieved. The resulting luminescent material may have an emission maximum at about 637 nm.

TABLE 14 lead doped antimonate compared with antimonate without lead at 400 nm excitation wavelength

| | Lead doped compound $Pb_{0.006}Ca_{0.6}Sr_{0.394}Sb_2O_6$ | Compound without lead $Ca_{0.6}Sr_{0.4}Sb_2O_6$ |
|---|---|---|
| Luminous density (%) | 102 | 100 |
| Wavelength (nm) | 637 | 638 |

Results obtained in respect to copper and/or lead doped antimonates are shown in table 15.

TABLE 15 optical properties of some copper and/or lead doped antimonates
excitable by long wave ultraviolet and/or by visible light and their luminous
density in % at about 400 nm excitation wavelength

| Composition | Possible excitation range (nm) | Luminous density at 400 nm excitation compared with copper/lead not doped compounds (%) | Peak wave length of lead/copper doped materials (nm) | Peak wave length of materials without lead/copper (nm) |
|---|---|---|---|---|
| $Pb_{0.2}Mg_{0.002}Ca_{1.798}Sb_2O_6F_2$:Mn | 360-400 | 102 | 645 | 649 |
| $Cu_{0.15}Ca_{1.845}Sr_{0.005}Sb_{1.998}Si_{0.002}O_7$:Mn | 360-400 | 101.5 | 660 | 658 |
| $Cu_{0.2}Mg_{1.7}Li_{0.2}Sb_2O_7$:Mn | 360-400 | 101.8 | 652 | 650 |
| $Cu_{0.2}Pb_{0.01}Ca_{0.79}Sb_{1.98}Nb_{0.02}O_6$:Mn | 360-400 | 98.5 | 658 | 658 |
| $Cu_{0.01}Ca_{1.99}Sb_{1.9995}V_{0.0005}O_7$:Mn | 360-400 | 100.5 | 660 | 657 |
| $Pb_{0.006}Ca_{0.6}Sr_{0.394}Sb_2O_6$ | 360-400 | 102 | 637 | 638 |
| $Cu_{0.02}Ca_{0.9}Sr_{0.5}Ba_{0.4}Mg_{0.18}Sb_2O_7$ | 360-400 | 102.5 | 649 | 645 |
| $Pb_{0.198}Mg_{0.004}Ca_{1.798}Sb_2O_6F_2$ | 360-400 | 101.8 | 628 | 630 |

Example 5

Luminescent materials for ultraviolet light or visible light excitation comprise lead and/or copper doped germanates and/or a germanate-silicates according to the formula as follows:

$$a(M'O).b(M''_2O).c(M''X).dGeO_2.e(M'''O).\\f(M''''_2O_3).g(M'''''_oO_p).h(M''''''_xO_y) \quad (17)$$

wherein M' may be Pb, Cu, and/or any combination thereof; M'' may be Li, Na, K, Rb, Cs, Au, Ag, and/or any combination thereof; M''' may be Be, Mg, Ca, Sr, Ba, Zn, Cd, and/or any combination thereof; M'''' may be Sc, Y, B, Al, La, Ga, In, and/or any combination thereof; M''''' may be Si, Ti, Zr, Mn, V, Nb, Ta, W, Mo, and/or any combination thereof; M'''''' may be Bi, Sn, Pr, Sm, Eu, Gd, Dy, and/or any combination thereof; X may be F; Cl, Br, I, and/or any combination thereof; $0<a\leq2$; $0\leq b\leq2$; $0\leq c\leq10$; $0<d\leq10$; $0\leq e\leq14$; $0\leq f\leq14$; $0\leq g\leq10$; $0<h\leq2$; $1\leq o\leq2$; $1\leq p\leq5$; $1\leq x\leq2$; and $1\leq y\leq5$.

Example of Preparation:
Preparation of the luminescent material having formula (18)

$$Pb_{0.004}Ca_{1.99}Zn_{0.006}Ge_{0.8}Si_{0.2}O_4\text{:Mn} \quad (18)$$

Starting materials: PbO, $CaCO_3$, ZnO, $GeO_2$, $SiO_2$, $MnCO_3$, and/or any combination thereof, The starting materials in the form of oxides and/or carbonates may be mixed in stoichiometric proportions together with small amounts of flux, for example, $NH_4Cl$. In a first step the mixture may be fired in an alumina crucible at about 1,200° C. in an oxygen-containing atmosphere for about 2 hours. Then, the material may be milled again. In a second step the mixture may be fired in an alumina crucible at about 1,200° C. in oxygen containing atmosphere for about 2 hours. After that the material may be milled, washed, dried and sieved. The resulting luminescent material may have an emission maximum at about 655 nm.

TABLE 16 lead doped Mn-activated germanate compared with Mn-activated germinate without lead at about 400 nm excitation wavelength

|  | Copper doped compound $Pb_{0.004}Ca_{1.99}Zn_{0.006}Ge_{0.8}Si_{0.2}O_4$:Mn | Comparison without copper $Ca_{1.99}Zn_{0.01}Ge_{0.8}Si_{0.2}O_4$:Mn |
|---|---|---|
| Luminous density (%) | 101.5 | 100 |
| Wavelength (nm) | 655 | 657 |

Preparation of the luminescent material having formula (19)

$$Cu_{0.46}Sr_{0.54}Ge_{0.6}Si_{0.4}O_3\text{:Mn} \quad (19)$$

Starting materials: CuO, $SrCO_3$, $GeO_2$, $SiO_2$, $MnCO_3$, and/or any combination thereof The starting materials in the form of oxides and/or carbonates may be mixed in stoichiometric proportions together with small amounts of flux, for example, $NH_4Cl$. In a first step the mixture may be fired in an alumina crucible at about 1,100° C. in an oxygen-containing atmosphere for about 2 hours. Then, the material may be milled again. In a second step the mixture may be fired in an alumina crucible at about 1,180° C. in an oxygen-containing atmosphere for about 4 hours. After that the material may be milled, washed, dried and sieved. The resulting luminescent material may have an emission maximum at about 658 nm.

TABLE 17 copper doped Mn-activated germanate-silicate compared with Mn-activated germanate-silicate without copper at 400 nm excitation wavelength

|  | Copper doped compound $Cu_{0.46}Sr_{0.54}Ge_{0.6}Si_{0.4}O_3$:Mn | Compound without copper $SrGe_{0.6}Si_{0.4}O_3$:Mn |
|---|---|---|
| Luminous density (%) | 103 | 100 |
| Wavelength (nm) | 658 | 655 |

TABLE 18 optical properties of some copper and/or lead doped germanate-
silicates excitable by long wave ultraviolet and/or by visible light and
their luminous density in % at about 400 nm excitation wavelength

| Composition | Possible excitation range (nm) | Luminous density at 400 nm excitation compared with copper/lead not doped compounds (%) | Peak wave length of lead/copper doped materials (nm) | Peak wave length of materials without lead/copper (nm) |
|---|---|---|---|---|
| $Pb_{0.004}Ca_{1.99}Zn_{0.006}Ge_{0.8}Si_{0.2}O_4$:Mn | 360-400 | 101.5 | 655 | 657 |
| $Pb_{0.002}Sr_{0.954}Ca_{1.044}Ge_{0.93}Si_{0.07}O_4$:Mn | 360-400 | 101.5 | 660 | 661 |
| $Cu_{0.46}Sr_{0.54}Ge_{0.6}Si_{0.4}O_3$:Mn | 360-400 | 103 | 658 | 655 |
| $Cu_{0.002}Sr_{0.998}Ba_{0.99}Ca_{0.01}Si_{0.98}Ge_{0.02}O_4$:Eu | 360-470 | 102 | 538 | 533 |
| $Cu_{1.45}Mg_{26.55}Ge_{9.4}Si_{0.6}O_{48}$:Mn | 360-400 | 102 | 660 | 657 |
| $Cu_{1.2}Mg_{26.8}Ge_{8.9}Si_{1.1}O_{48}$:Mn | 360-400 | 103.8 | 670 | 656 |
| $Cu_4Mg_{20}Zn_4Ge_5Si_{2.5}O_{38}F_{10}$:Mn | 360-400 | 101.5 | 658 | 655 |
| $Pb_{0.001}Ba_{0.849}Zn_{0.05}Sr_{1.1}Ge_{0.04}Si_{0.96}O_4$:Eu | 360-470 | 101.8 | 550 | 545 |
| $Cu_{0.05}Mg_{4.95}GeO_6F_2$:Mn | 360-400 | 100.5 | 655 | 653 |
| $Cu_{0.05}Mg_{3.95}GeO_{5.5}F$:Mn | 360-400 | 100.8 | 657 | 653 |

Example 6

Luminescent materials for ultraviolet light or visible light excitation comprise lead and/or copper doped phosphates according to the formula as follows:

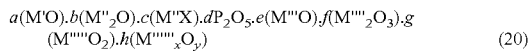
$$a(M'O).b(M''_2O).c(M''X).dP_2O_5.e(M'''O).f(M''''_2O_3).g(M'''''O_2).h(M''''''_xO_y)\quad (20)$$

wherein M' may be Pb, Cu, and/or any combination thereof; M'' may be Li, Na, K, Rb, Cs, Au, Ag, and/or any combination thereof; M''' may be Be, Mg, Ca, Sr, Ba, Zn, Cd, Mn, and/or any combination thereof; M'''' may be Sc, Y, B, Al, La, Ga, In, and/or any combination thereof, M''''' may be Si, Ge, Ti, Zr, Hf; V, Nb, Ta, W, Mo, and/or any combination thereof; M'''''' may be Bi, Sn, Pr, Sm, Eu, Gd, Dy, Ce, Tb, and/or any combination thereof; X may be F, Cl, Br, I, and/or any combination thereof; $0<a\leq 2$; $0\leq b\leq 12$; $0\leq c\leq 16$; $0<d\leq 3$; $0\leq e\leq 5$; $0\leq f\leq 3$; $0\leq g\leq 2$; $0<h\leq 2$; $1\leq x\leq 2$; and $1\leq y\leq 5$.

The luminescent materials comprising the lead and/or copper doped phosphates may be used as compounds for ultraviolet light in a light emitting device.

Examples of Preparation

Preparation of the luminescent material having formula (21)

$$Cu_{0.02}Ca_{4.98}(PO_4)_3Cl:Eu \quad (21)$$

Starting materials: CuO, $CaCO_3$, $CaCO_3(PO_4)_2$, $CaCl_2$, $Eu_2O_3$, and/or any combination thereof, The starting materials in the form of oxides, phosphates, and/or carbonates and chlorides may be mixed in stoichiometric proportions together with small amounts of flux. The mixture may be fired in an alumina crucible at about 1,240° C. in reducing atmosphere for about 2 hours. After that the material may be milled, washed, dried and sieved. The luminescent material may have an emission maximum at about 450 nm.

TABLE 19 copper doped $Eu^{+2}$-activated chlorophosphate compared with $Eu^{+2}$-activated chlorophosphate without copper at about 400 nm excitation wavelength

|  | Copper doped compound $Cu_{0.02}Ca_{4.98}(PO_4)_3Cl$:Eu | Compound without copper $Ca_5(PO_4)_3Cl$:Eu |
|---|---|---|
| Luminous density (%) | 101.5 | 100 |
| Wavelength (nm) | 450 | 447 |

TABLE 20 copper and/or lead doped phosphates excitable by long wave ultraviolet
and/or by visible light and their luminous density in % at about 400 nm
excitation wavelength

| Composition | Possible excitation range (nm) | Luminous density at 400 nm excitation compared with copper/lead not doped compounds (%) | Peak wave length of lead/copper doped materials (nm) | Peak wave length of materials without lead/copper (nm) |
|---|---|---|---|---|
| $Cu_{0.02}Sr_{4.98}(PO_4)_3Cl$:Eu | 360-410 | 101.5 | 450 | 447 |
| $Cu_{0.2}Mg_{0.8}BaP_2O_7$:Eu, Mn | 360-400 | 102 | 638 | 635 |
| $Pb_{0.5}Sr_{1.5}P_{1.84}B_{0.16}O_{6.84}$:Eu | 360-400 | 102 | 425 | 420 |
| $Cu_{0.5}Mg_{0.5}Ba_2(P,Si)_2O_8$:Eu | 360-400 | 101 | 573 | 570 |
| $Cu_{0.5}Sr_{9.5}(P,B)_6O_{24}Cl_2$:Eu | 360-410 | 102 | 460 | 456 |
| $Cu_{0.5}Ba_3Sr_{6.5}P_6O_{24}(F,Cl)_2$:Eu | 360-410 | 102 | 443 | 442 |
| $Cu_{0.05}(Ca,Sr,Ba)_{4.95}P_3O_{12}Cl$:Eu, Mn | 360-410 | 101.5 | 438, 641 | 435, 640 |
| $Pb_{0.1}Ba_{2.9}P_2O_8$:Eu | 360-400 | 103 | 421 | 419 |

Lead and/or copper doped luminescent materials can be act as converter for light emitting devices, such as ultraviolet as well as blue emitting LEDs, back lights and painting pigments. They can convert the excitation wavelength from the ultraviolet and blue light to longer visible wavelength. For all color temperatures as well as for all color coordinates inside of the white light coordinates color mixture can be found. That is caused by the different emission colors corresponding to the RGB principle by using different kinds of luminescent materials.

What is claimed is:

1. A luminescent material for an LED, comprising:
a compound including a host lattice,
wherein the host lattice comprises first group ions and oxygen,
wherein the first group includes at least one of Be, Mg, Ca, Sr, Ba, Zn, Cd, and Mn,
wherein a first portion of the first group ions is substituted by divalent copper ions,
wherein a second portion of the first group ions is substituted by lead ions, and
wherein the compound has the formula $$a(M'O).b(M''_2O).c(M''X).d(Sb_2O_5).e(M'''O).f(M''''_xO_y),$$

wherein:
M' is a combination of Cu and Pb;
M'' is Li, Na, K, Rb, Cs, Au, Ag, or any combination thereof;
M''' is Be, Mg, Ca, Sr, Ba, Zn, Cd, Mn, or any combination thereof;
M'''' is Bi, Sn, Sc, Y, La, Pr, Sm, Eu, Tb, Dy, Gd, or any combination thereof;
X is F, Cl, Br, I, or any combination thereof;
$0<a\leq 2$;
$0\leq b\leq 2$;
$0\leq c\leq 4$;
$0<d\leq 8$;
$0\leq e\leq 8$;
$0<f\leq 2$;
$1\leq x\leq 2$; and
$1\leq y\leq 5$.

2. A luminescent material for an LED, comprising:
a compound including a host lattice,
wherein the host lattice comprises first group ions and oxygen,
wherein the first group includes at least one of Be, Mg, Ca, Sr, Ba, Zn, and Cd,
wherein a first portion of the first group ions is substituted by divalent copper ions,
wherein a second portion of the first group ions is substituted by lead ions, and
wherein the compound has the formula $$a(M'O).b(M''_2O).c(M''X).d(GeO_2).e(M'''O).f(M''''_2O_3).g(M'''''_oO_p).h(M''''''_xO_y),$$

wherein:
M' is a combination of Cu and Pb;
M'' is Li, Na, K, Rb, Cs, Au, Ag, or any combination thereof;
M''' is Be, Mg, Ca, Sr, Ba, Zn, Cd, or any combination thereof;
M'''' is Sc, Y, B, Al, La, Ga, In, or any combination thereof;
M''''' is Si, Ti, Zr, Mn, V, Nb, Ta, W, Mo, or any combination thereof;
M'''''' is Bi, Sn, Pr, Sm, Eu, Gd, Dy, or any combination thereof;
X is F, Cl, Br, I, or any combination thereof;
$0<a\leq 2$;
$0\leq b\leq 2$;
$0\leq c\leq 10$;
$0<d\leq 10$;
$0<e\leq 14$;
$0\leq f\leq 14$;
$0\leq g\leq 10$;
$0<h\leq 2$;
$0\leq o\leq 2$;
$1\leq p\leq 5$;
$1\leq x\leq 2$; and
$1\leq y\leq 5$.

3. A luminescent material for an LED, comprising:
a compound including a host lattice,
wherein the host lattice comprises first group ions and oxygen,
wherein the first group includes at least one of Be, Mg, Ca, Sr, Ba, Zn, Cd, and Mn,
wherein a first portion of the first group ions is substituted by divalent copper ions,
wherein a second portion of the first group ions is substituted by lead ions, and
wherein the compound has the formula $$a(M'O).b(M''_2O).c(M''X).d(P_2O_5).e(M'''O).f(M''''_2O_3).g(M'''''O_2).h(M''''''_xO_y),$$

wherein:
M' is a combination of Cu and Pb;
M'' is Li, Na, K, Rb, Cs, Au, Ag, or any combination thereof;
M''' is Be, Mg, Ca, Sr, Ba, Zn, Cd, Mn, or any combination thereof;
M'''' is Sc, Y, B, Al, La, Ga, In, or any combination thereof;
M''''' is Si, Ge, Ti, Zr, Hf, V, Nb, Ta, W, Mo, or any combination thereof;
M'''''' is Bi, Sn, Pr, Sm, Eu, Gd, Dy, Ce, Tb or any combination thereof;
X is F, Cl, Br, I, or any combination thereof;
$0<a\leq 2$;
$0\leq b\leq 12$;
$0\leq c\leq 16$;
$0<d\leq 3$;
$0<e\leq 5$;
$0\leq f\leq 3$;
$0\leq g\leq 2$;
$0<h\leq 2$;
$1\leq x\leq 2$; and
$1\leq y\leq 5$.

4. The luminescent material according to claim 1, wherein the compound comprises Eu.

5. The luminescent material according to claim 2, wherein the compound comprises Eu.

6. The luminescent material according to claim 3, wherein the compound comprises Eu.

* * * * *